United States Patent [19]
Svensson

[11] Patent Number: 5,871,309
[45] Date of Patent: Feb. 16, 1999

[54] MILLING CUTTER BODY AND METHODS FOR ASSEMBLING SAME

[75] Inventor: Sven Svensson, Sandviken, Sweden

[73] Assignee: Sandvik Aktiebolag, Sandviken, Sweden

[21] Appl. No.: 798,135

[22] Filed: Feb. 12, 1997

[30] Foreign Application Priority Data

Feb. 28, 1996 [SE] Sweden .................................. 9600757

[51] Int. Cl.⁶ ....................................................... B23C 5/22
[52] U.S. Cl. ................................ 407/40; 407/47; 407/53
[58] Field of Search ................................. 407/40, 36, 34, 407/38, 39, 53, 54, 55, 56, 47

[56] References Cited

U.S. PATENT DOCUMENTS

| | | | |
|---|---|---|---|
| 3,955,259 | 5/1976 | Gustafsson | 407/40 X |
| 4,352,609 | 10/1982 | Hopkins | 407/42 |
| 4,954,021 | 9/1990 | Tsujimura et al. | 407/53 X |
| 4,995,767 | 2/1991 | Segal | 407/41 |
| 5,199,827 | 4/1993 | Pantzar . | |

FOREIGN PATENT DOCUMENTS 003714533  11/1987  Germany ................................. 407/53

*Primary Examiner*—A. L. Pitts
*Assistant Examiner*—Henry W. H. Tsa
*Attorney, Agent, or Firm*—Burns, Doane, Swecker & Mathis, L.L.P.

[57] ABSTRACT

A rotary milling cutter body includes a plurality of inserts positioned at a positive axial angle and a negative radial angle. Shims are disposed behind respective inserts. One of the shims is thinner than the other shims (e.g., by 20–150$\mu$m) so that the insert associated with the thinner shim has a greater axial projection than the other inserts. If shims are not used, one of the inserts could be thinner than the other inserts to achieve the same effect.

10 Claims, 3 Drawing Sheets

MILLING CUTTER BODY AND METHODS FOR ASSEMBLING SAME

BACKGROUND OF THE INVENTION

The present invention relates to a method of assembling cutting inserts on a milling cutter body, and to a milling cutter body on which the inserts have been assembled.

In milling cutter tools having detachably clamped cutting inserts, it has often turned out to be difficult to position the inserts with the required precision for ensuring that a good surface smoothness on the workpiece is achieved, and for ensuring a long tool life. In order to attain the required surface smoothness, it is required that the cutting inserts attain the most exact position as possible, in particular in the axial direction, i.e., parallel to the axis of rotation of the tool. If the axial positioning is unsatisfactory, then an axial play arises, which results in a deteriorated surface smoothness. On the other hand, tests have shown that the best surfaces are obtained if the surface is generated by only one of the inserts which protrudes axially forwardly beyond the other inserts.

For commercially available milling cutters, the axial play, i.e., the maximum axial distance between the operative parallel land cutting edges of two individual inserts, may for instance be around 30 $\mu$m. However, since the size of this play is purely random, more than one cutting insert may protrude axially relative to other cutting edges. If then two protruding cutting inserts become located circumferentially one after the other in the milling cutter body, there is a risk that the second cutting insert will not cut a proper chip, but instead will only scratch the surface in an undesired way.

The milling cutter bodies of today are usually constructed with a positive axial angle and a negative radial angle. A representative example of this arrangement is shown in Pantzar U.S. Pat. No. 5,199,827, which is hereby incorporated by reference. This has been found to result in a favorable chip breaking due to the fact that the chips are directed outwards, away from the milling cutter body, and upwards, away from the workpiece. Over the years, this positive/negative basic geometry has established its position as generally the most useful.

Thus, a primary object of the present invention is to enable an improved workpiece surface to be obtained by means of milling cutter bodies having said positive/negative basic geometry.

A further object of the present invention is to improve the surface on the workpiece independently of the radial angle of the cutting inserts.

Still another object is to provide a simple way of positioning one of the cutting inserts in the milling cutter body axially forwardly of the others.

SUMMARY OF THE INVENTION

These and further objects have been solved in a surprisingly simple way by mounting the inserts on respective seats of the milling cutter body at a positive axial angle, and positioning behind each insert a shim, with one of the shims being thinner than other shims to make an axial projection of the insert associated with the thinner shim greater than that of the other inserts.

Alternatively, one of the inserts could be made thinner, rather than one of the shims.

Another aspect of the invention relates to a rotary milling cutter comprising a body having a plurality of seats, cutting inserts mounted on respective seats at a positive axial angle, and shims disposed behind respective cutting inserts. One of the shims is thinner than other shims so that an axial projection of an insert associated with the thinner shim is greater than that of the other inserts.

Alternatively, one of the inserts could be made thinner, rather than one of the shims.

BRIEF DESCRIPTION OF THE DRAWING

The objects and advantages of the invention will become apparent from the following detailed description of preferred embodiments thereof in connection with the accompanying drawing in which like numerals designate like elements, and in which.

Detailed Description of Preferred Embodiments of the Invention

Figure 1:
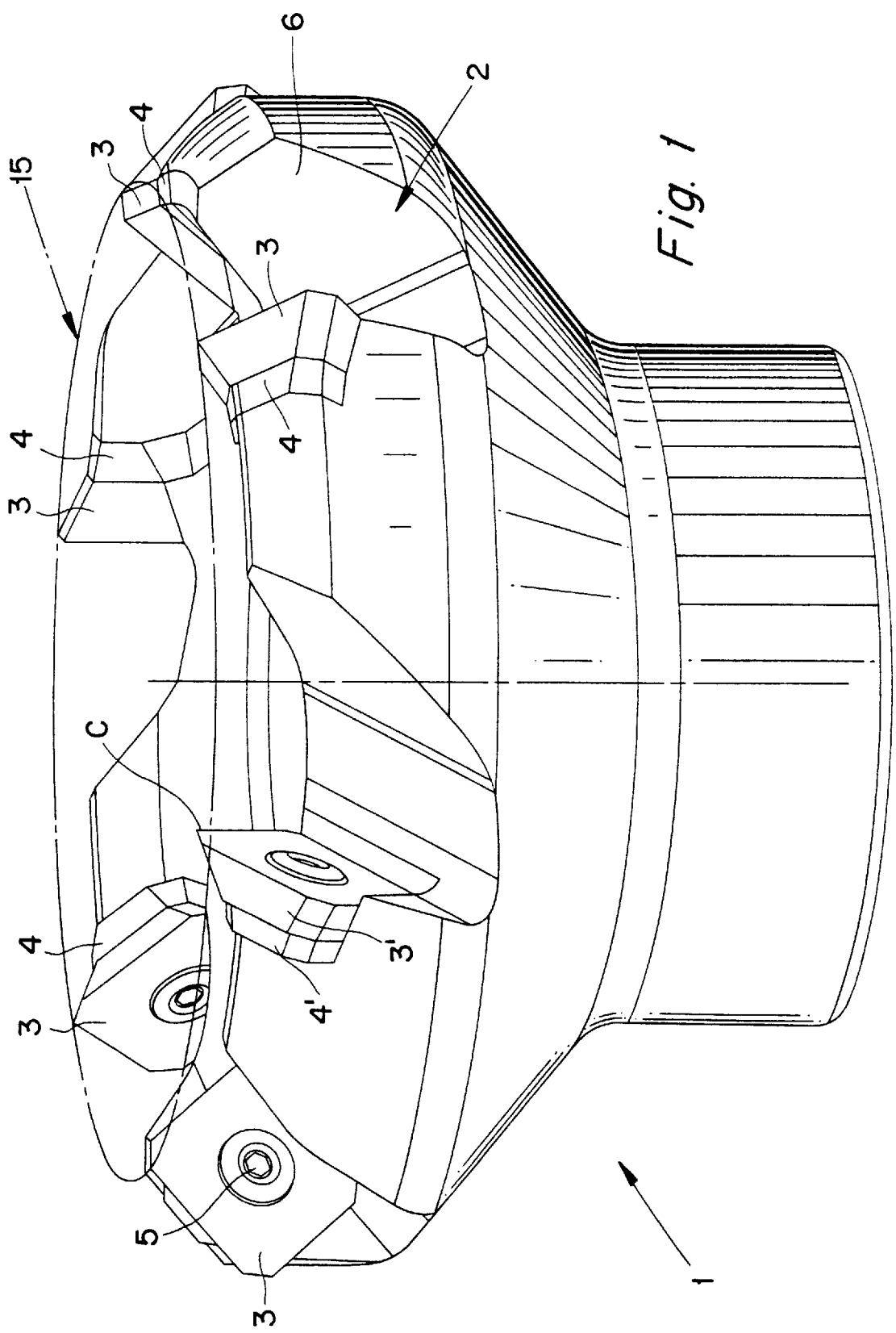
FIG. 1 shows a milling cutter body in a perspective view obliquely from above, in accordance with the present invention.

FIG. 1 shows generally a milling cutter body 1 with six insert seats 2, the seats being configured according to the prior art. In each insert seat, except for one, there is mounted cutting insert 3 and a shim 4, which have been fastened in the insert seat by means of a locking screw 5. In front of each insert, in the direction of rotation, there is a milled-out chip pocket 6. In one insert seat a shim 4' according to the present invention is disposed as will be discussed later.

Figure 2:
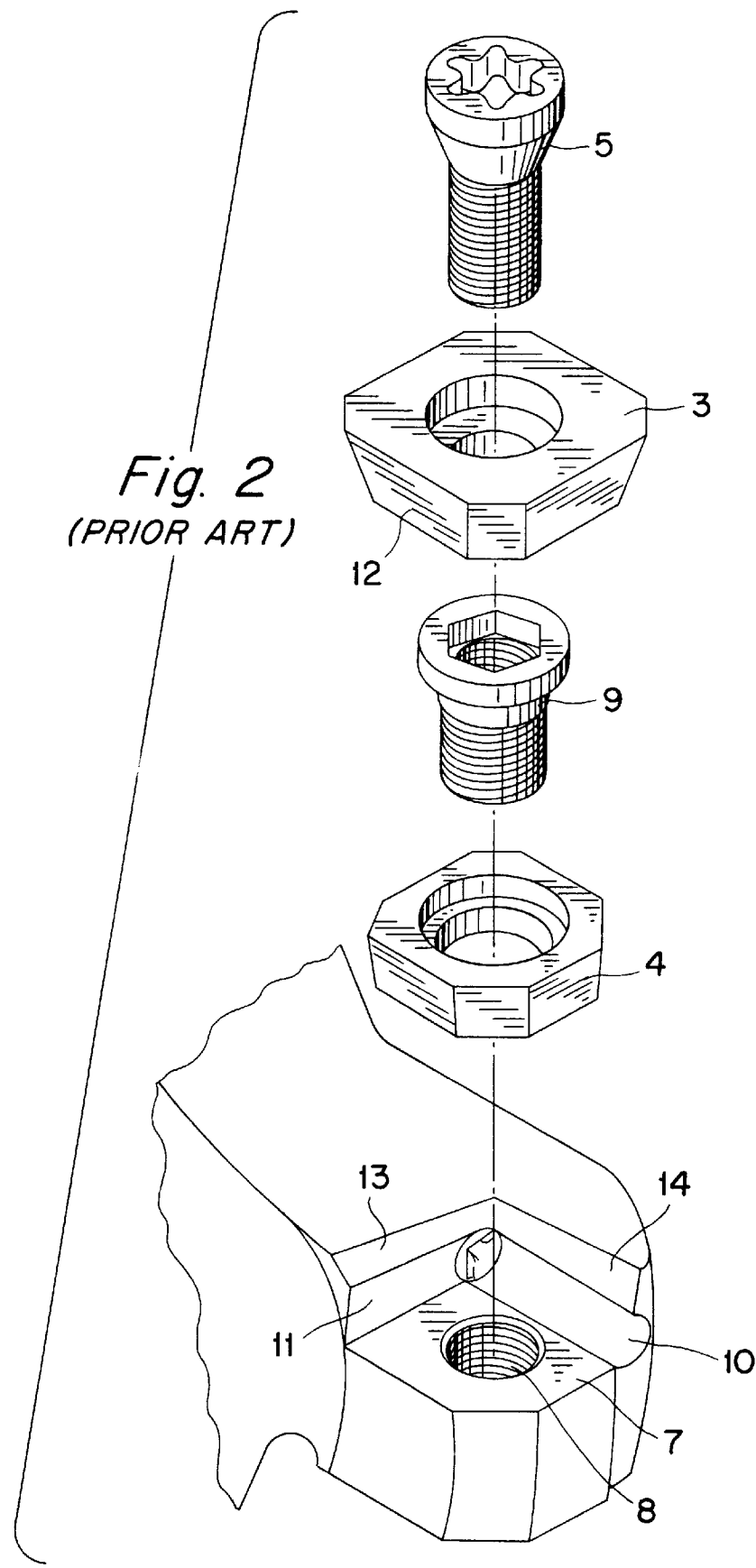
FIG. 2 shows an exploded view of an insert seat in perspective, obliquely from above.

The mounting per se of a cutting insert may be clearly seen in FIG. 2. An insert seat usually comprises a bottom support surface 7 with a threaded hole 8 intended for receiving a shim screw 9. The head of the shim screw clamps a shim 4. Normally, this support shim does not bear on side surfaces 10 and 11 of the seat, which are thus free surfaces. Above the shim 4 is fastened a cutting insert 3, e.g., a square indexable insert, by means of a locking screw 5, which is threaded into an internal thread of the shim screw 9. Two of the side surfaces 12 of the cutting insert abut against support surfaces 13 and 14, respectively, of the insert seat. These surfaces 13, 14 are angled in order to correspond to the positive orientation of the side surfaces 12, as expressed by means of a relief angle $\alpha_n$, see FIG. 3.

Figure 5:
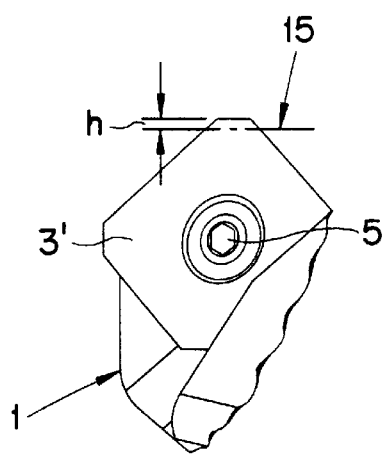
FIG. 5 is a fragmentary front view of an insert depicted in FIG. 1 which is associated with a thin shim according to the invention.

As mentioned above, the milling cutter body shown in FIG. 1, as well as the insert seat shown in FIG. 2, represent the prior art for milling cutter bodies having a positive axial angle and a negative radial angle. In accordance with the present invention a shim 4' is provided which is thinner than the prior art shims 4, the latter having substantially the same thickness 6. Since the cutting insert is positive, i.e., the side or relief surfaces 12 form an acute angle $\alpha_n$ with the upper or chip surface of the insert and an obtuse angle with the bottom surface of the insert, and since the inserts 12 are angled axially positively in the holder, the use of a thinner shim associated with one of the inserts (e.g., insert 3') results in that insert 3' assuming a more axially protruding position than the other inserts. Thus, the increased axial projection h (FIG. 5), depends on one hand, on the fact that the axial and radial support surfaces end up higher on the cutting insert (positive cutting insert) and, on the other hand, on the fact that a positive axial angle results in the axial projection increasing when the cutting insert is located deeper down in the insert seat. In FIG. 1 the plane of rotation of the operative cutting corners of the five inserts 3, whose appurtenant shims 4 have the same thickness, is illustrated by a ring 15. The operative insert corner C of the sixth cutting insert 3' is situated axially forwardly of this plane by the projection h distance, which for sake of illustration has been exaggerated in FIG. 1.

Figure 3:
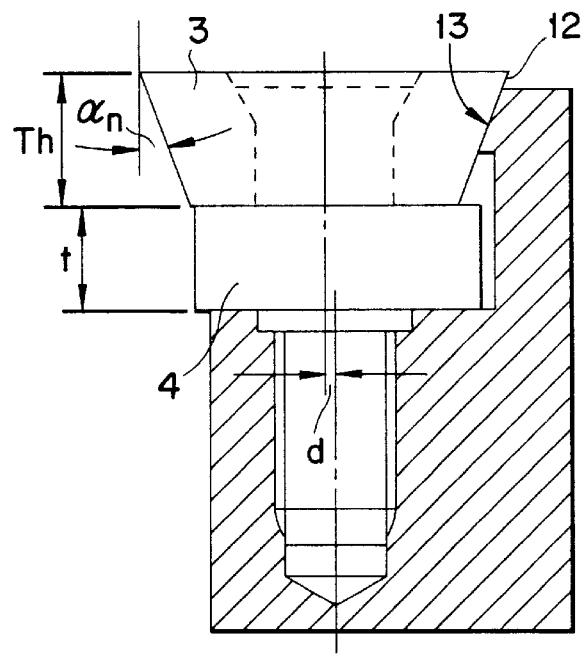

FIG. 3 shows an insert seat with a cutting insert 3 and a shim 4, whose thickness is t. The side surface 12 of the insert bears against the support surface 13 of the insert seat.

Figure 4:
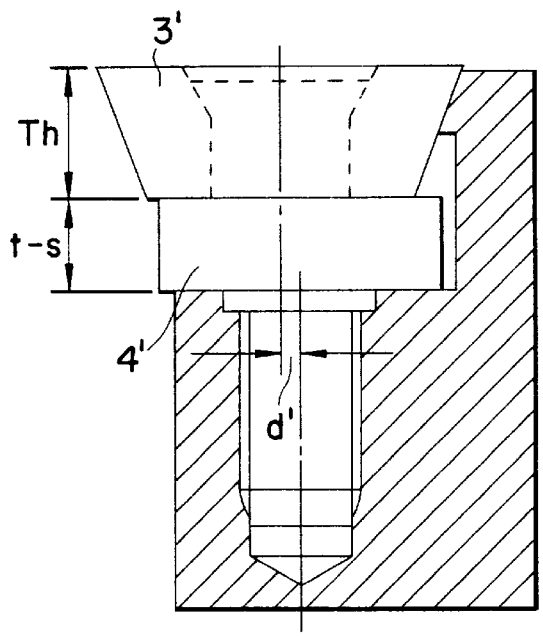
FIGS. 3 and 4 show basic drawings of an insert seat, the milling cutter body per se being shown sectionally.

FIG. 4 shows the same insert seat as FIG. 3, however with the sole difference being that the shim 4' is thinner than t by a distance s; thus the thickness of the shim 4' is t-s. This difference of thickness s creates an additional axial projection h of the insert 4' according to the following relation (I):

$$h = s \cdot \frac{\sin(\alpha_n + \gamma_o)}{\cos\alpha_n} \cdot \cos\gamma_o \cdot \cos\chi_r + \frac{\sin(\alpha_n + \lambda_s)}{\cos\alpha_n} \cdot \cos\lambda_s \cdot \cos\chi \quad (I)$$

where $\alpha_n$=the insert-inherent clearance angle,
$\gamma_o$=the rake angle,
$\chi_r$=the setting angle, and
$\lambda_s$=the inclination angle.

All used terms are according to ISO standard 3002/1-1982 which is incorporated by reference herein.

With an inclination angle $\lambda_s$ of 23°, a clearance angle $\alpha_n$ of 20°, a rake angle $\gamma_o$ of 7.9° and a setting angle $\chi_r$ of 45.6°, the obtained axial displacement was measured for a number of shims 41 of different thicknesses. The other shims 4 on the tool have a thickness of 3.00 mm. The actually measured h values for different s values are set forth below:

| s value in mm | h value in mm |
| --- | --- |
| 0.03 | 0.38 |
| 0.07 | 0.063 |
| 0.10 | 0.090 |
| 0.15 | 0.133 |
| 0.20 | 0.184 |

Because of manufacturing tolerances, these values do not fully correspond to the above theoretical relation (I), but anyway the correlation may be clearly seen.

As may be seen from the h values above, there is a possibility to obtain a controlled axial play for one of the cutting inserts 3. The other inserts would have a considerably smaller axial play, for instance on the order of magnitude 10 $\mu$m. Examples of milling cutter bodies where such small axial plays are achieved are described in, e.g., the Swedish Patent Applications No. 9502645-6 and No. 9504688-4, but as such, the invention is generally applicable for all known milling cutter bodies with a positive axial inclination and a limited play of the other cutting inserts. This axial play for the other inserts should suitably lie below 30 $\mu$m, preferably below 20 $\mu$m and in particular below 10 $\mu$m. Thus, due to the fact that the other cutting inserts have a small axial play, it is guaranteed that only the insert 3' with a thin shim 4' protrudes axially and produces the desired smoother surface. Tests have shown that the cutting insert that generates the surface should protrude axially forwardly by 20 to 80 $\mu$m beyond the other inserts in the milling cutter body, preferably between 30 and 70 $\mu$m and most preferably between 40 and 60 $\mu$m. The measure s for the thinner shim 4' is suitably between 20 and 150 $\mu$m, preferably between 40 and 100 $\mu$m.

Also the radial projection of the insert 3' increases somewhat when a thinner shim 4' is used. However, here the values are smaller than for the axial projection and do not cause any noticeable wear of that specific insert in comparison with the other inserts. Furthermore, an increased radial projection is counteracted by a negative radial angle. However, also a positive radial angle per se does not influence the function according to the invention.

Due to the thinner shim, of course the preset tension increases somewhat in the screw 5 (compare the distances d and d' in FIGS. 3 and 4). However, the increase of the preset tension is negligible and standard screws may be used without any problem.

In order to be able to clearly identify the thinner shim 4' and the "normal" shims 4, the thinner shim 4' should be distinguished in some way. They may for instance be color-marked, such as by a particular surface coating. Both the cutting insert and shims are usually made of cemented carbide.

Figure 6:
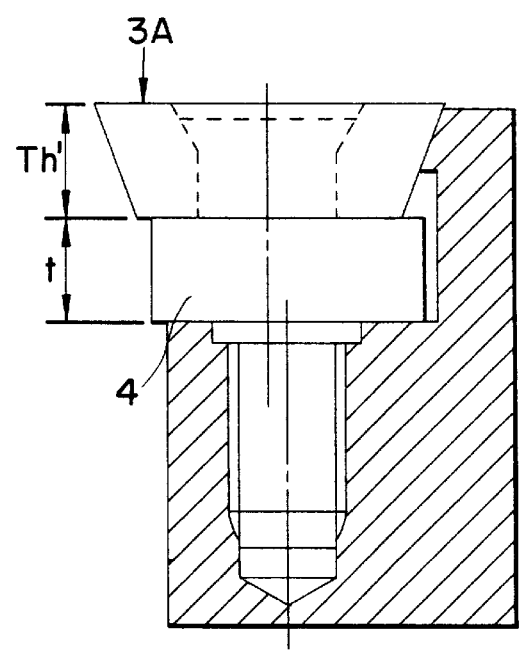
FIG. 6 is a view similar to FIG. 4 of an alternative embodiment.

Finally it should be pointed out that the inventor has certainly also considered the possibility of manufacturing one of the inserts 3A somewhat thinner, instead of the shim, as shown in FIG. 6 wherein insert thickness Th' is less than Th in FIG. 4. In the same way as explained above, the operative corner of the insert 3A is displaced axially forwardly. This could for instance be applied in those cases where shims are not used. Although this constitutes a less preferred embodiment, it is within the scope of the present invention.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A method for arranging cutting inserts on a rotary milling cutter body, comprising the steps of mounting the inserts on respective seats of the body at a positive axial angle, and positioning behind each insert a shim, with one of the shims being thinner than other shims to make an axial projection of the insert associated with the thinner shim greater than that of the other inserts.

2. The method according to claim 1, wherein the positioning step includes employing a thinner shim which is between 20 and 150 $\mu$m thinner than the other shims.

3. A method for arranging cutting inserts on a milling cutter body, comprising mounting the inserts on respective seats of the body at a positive axial angle, with one of the inserts being thinner than other inserts to make an axial projection of the one insert greater than that of the other inserts.

4. The method according to claim 3, wherein the mounting step includes employing the thinner insert which is between 20 and 150 $\mu$m thinner than the other inserts.

5. A rotary milling cutter comprising a body having a plurality of seats, cutting inserts mounted on respective seats at a positive axial angle, and shims disposed behind respective cutting inserts, one of the shims being thinner than other shims so that an axial projection of an insert associated with the thinner shim is greater than that of the other inserts.

6. The rotary milling cutter according to claim 5, wherein the one shim is between 20 and 150 $\mu$m thinner than the other shims.

7. The rotary milling cutter according to claim 5, wherein the inserts are disposed at a negative radial angle.

8. A rotary milling cutter comprising a body having a plurality of seats, and cutting inserts mounted on respective seats at a positive axial angle, one of the inserts being thinner than other inserts so that an axial projection of the one insert is greater than that of the other inserts.

9. The rotary milling cutter according to claim 8, wherein the one insert is between 20 and 150 $\mu$m thinner than the other inserts.

10. The rotary milling cutter according to claim 8, wherein the inserts are disposed at a negative radial angle.

* * * * *